United States Patent [19]

Shioda et al.

[11] Patent Number: 4,688,961
[45] Date of Patent: Aug. 25, 1987

[54] COMBINATION CLIP

[75] Inventors: Mitsugu Shioda, Yokohama; Atsushi Takahashi, Fujisawa, both of Japan

[73] Assignee: Nifco Inc., Yokohama, Japan

[21] Appl. No.: 838,101

[22] Filed: Mar. 10, 1986

[30] Foreign Application Priority Data

Mar. 15, 1985 [JP] Japan .............................. 60-36113[U]

[51] Int. Cl.<sup>4</sup> ............................................... B25G 3/36
[52] U.S. Cl. ..................................... 403/389; 403/397; 403/406.1; 24/575; 24/669
[58] Field of Search ............ 403/389, 385, 397, 406.1, 403/340, 373, 314, 309, 364, 339, 331; 24/579, 575, 589, 669, 702; 411/509

[56] References Cited

U.S. PATENT DOCUMENTS 2,832,443  4/1958  Cutler ................................... 403/364
2,945,713  7/1960  Sears .................................... 403/385
3,521,332  7/1970  Kramer ................................. 403/241
3,776,092  12/1973  Seckerson ............................. 411/509
4,115,966  9/1978  DeLee ................................... 403/385

Primary Examiner—Cornelius J. Husar
Assistant Examiner—Peter M. Cuomo
Attorney, Agent, or Firm—Trexler, Bushnell, Giangiorgi & Blackstone, Ltd.

[57] ABSTRACT

A combination clip comprises a pair of identically shaped clips each having a holder portion provided at one end for detachably holding a supported member and a pivotal coupler portion provided at the other end. The pivotal coupler portion includes a shaft portion and a clamp portion which is open on one side, extends perpendicular to the shaft portion in spaced relation to the free end thereof and is capable of being fitted on the shaft portion of the other clip. The pair of clips can be pivotally coupled together for relative rotation about each other's shaft portions with the clamp portion of each clip fitted on the shaft portion of the other.

3 Claims, 9 Drawing Figures

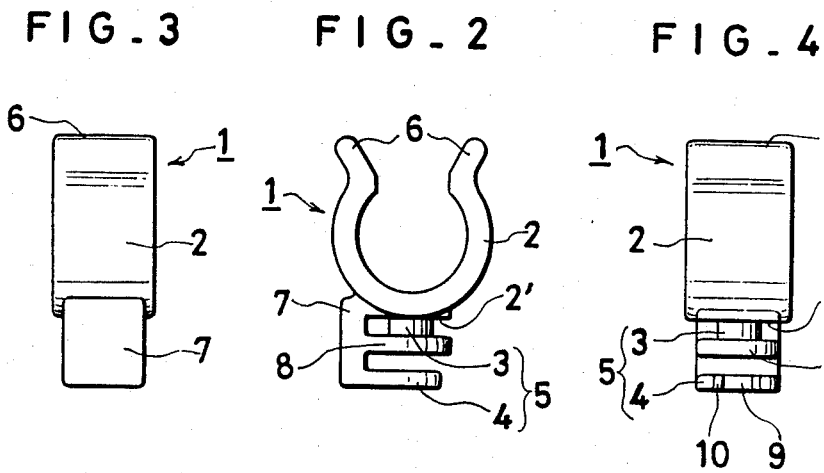

COMBINATION CLIP

FIELD OF THE INVENTION AND RELATED ART STATEMENT

This invention relates to a combination clip which consists of a pair of clips mutually rotatably coupled together for holding respective supported members at a fixed distance from each other.

A prior art combination clip of the general type to which the present invention relates is disclosed in Japanese Utility Model Publication SHO No. 48(1973)-35637.

The combination clip disclosed in this Publication consists of a pair of clips, each of which has a holder portion provided at one end and a coupler portion provided at the other end. The coupler portion of one of the two clips is a spherical projection, while the coupler portion of the other clip is a spherical recess for receiving the spherical projection. The two clips are rotatably coupled together by the engagement between the spherical projection and the spherical recess.

However, since this combination clip consists of a pair of clips with coupler portions having different shapes, it is necessary to provide two molds having different shapes for forming the pair of clips. In addition, the two clips having the different shapes can only be used together as a pair, i.e. they cannot be used independently.

To reduce the manufacturing cost and facilitate handling, there is required a combination clip consisting of a pair of identically shaped clips but capable of fulfilling the same functions as the prior art combination clip.

OBJECT AND SUMMARY OF THE INVENTION

An object of the invention is to provide a combination clip which is economical and can be easily handled.

To attain the above object of the invention, there is provided a combination clip comprising a pair of identically shaped clips, each of the clips having a holder portion provided at one end for detachably holding a supported member and a pivotal coupler portion provided at the other end, the pivotal coupler portion including a shaft portion and a clamp portion, the clamp portion being open on one side, extending perpendicular to the shaft portion in spaced relation to the free end thereof and being capable of being fitted on the shaft portion of the other clip, whereby the pair of clips can be coupled together for rotation about each other's shaft portions with the clamp portion of each clip fitted on the shaft portion of the other.

Thus, according to the invention the pair clips, which are of identical shape, can be molded using a common mold. Further, the clips of any given combination clip are each interchangeable with either clip of a different combination clip. The pivotal coupler portions may be coupled together after attaching the supported members, e.g. wires or pipes, to the holder portions of the individual clips. Alternatively, the two clips may be coupled together before attaching the supported members to the holder portions. The two clips may be coupled together by forcibly inserting the clamp portion of the pivotal coupler portion of each clip into the pivotal coupler portion of the other clip from the open side. By doing so, the shaft portions of the two clips are each received in the clamp portion of the other, so that the two clips are coupled together for mutual rotation about each other's shaft portions. In this state, the holder portions of the two clips are spaced apart a fixed distance, so that the supported members held by the holder portions are spaced apart a proper distance from each other to prevent their mutual interference.

The above and other objects and features of the invention will become more apparent from the following detailed description with reference to the accompanying drawings.

BRIEF DESCRIPTION OF THE DRAWINGS

FIG. 2 is a front view showing one of the pair of clips of the combination clip shown in FIG. 1;

FIG. 3 is a left side view showing one of the clips shown in FIG. 1;

FIG. 4 is a right side view showing one of the clips shown in FIG. 1;

FIG. 5 is a plan view showing one of the clips shown in FIG. 1;

FIG. 6 is a bottom view showing one of the clips shown in FIG. 1;

FIG. 7 is a front view showing the two clips coupled together;

FIG. 9 is a front view showing the combination clip of FIG. 8 in the coupled state.

DETAILED DESCRIPTION OF THE PREFERRED EMBODIMENTS

Figure 1:
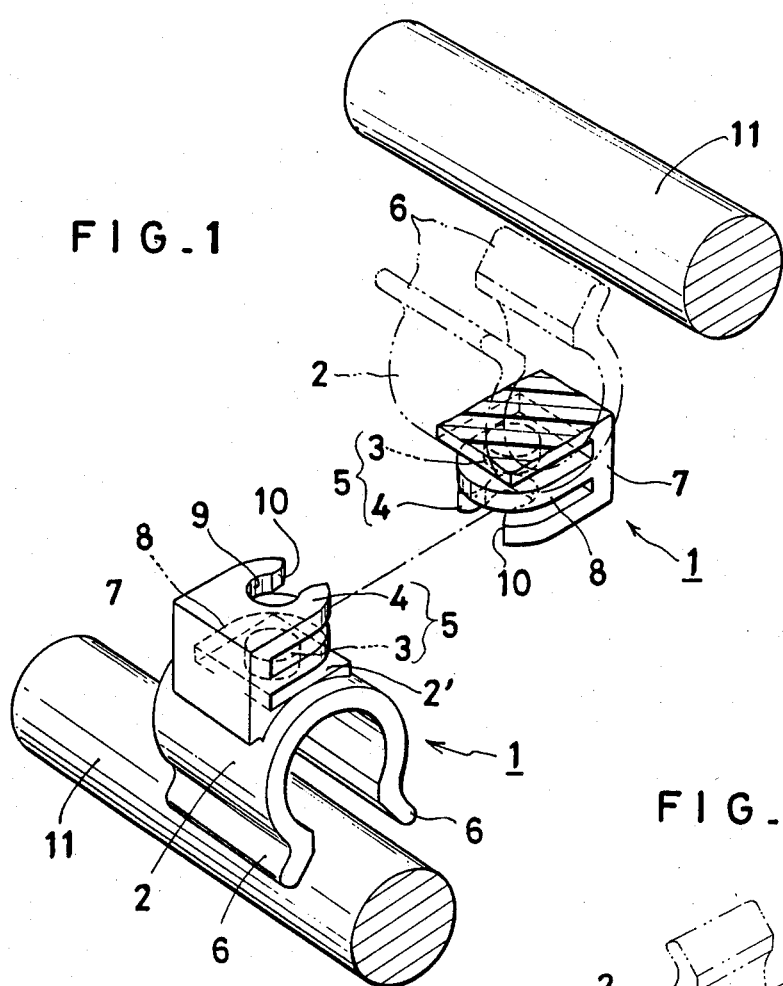
FIG. 1 is an exploded perspective view showing an embodiment of the combination clip according to the invention.

The combination clip according to the invention will now be described in conjunction with a first embodiment of the invention shown in FIGS. 1 to 7. Reference numeral 1 designates the respective members of a pair of plastic clips constituting the combination clip. The two clips 1 are molded using a common mold and are of identical shape.

Each clip 1 has a holder portion 2 provided at one end for detachably holding a supported member and a pivotal coupler portion 5 provided at the other end, the pivotal coupler portion 5 including a cylindrical shaft portion 3 extending from the holder portion 2 and a clamp portion 4 which is open on one side, extends perpendicular to the shaft portion 3 in spaced relation to the free end thereof and is capable of being fitted on the shaft portion 3 of the other clip.

The holder portion 2 has a C-shaped sectional profile and is open at its free end. At the open end, it has flared opposite edge portions 6 serving as guides.

In this embodiment, the pivotal coupler portion 5 includes a side portion 7 perpendicularly extending from one side of a bottom portion 2' integral with the holder portion 2. An intermediate portion 8 extends from an intermediate position of the side portion 7 in parallel with the bottom portion 2'. The shaft portion 3 extends in the gap between the intermediate portion 8 and the bottom portion 2'. The clamp portion 4 extends from the free end of the side portion 7 in parallel with the intermediate portion 8. The clamp portion 4 has a notch formed from its free end. The notch has a circular, more precisely an arcuate, inner portion 9 and flared opposite portions 10 adjacent to its notch.

The clip having above structure is made of a plastic material having adequate rigidity and elasticity. A pair of such clips are used in a mutually coupled state. In use, a supported member, e.g. an electric wire 11, is mounted in advance in the holder portion 2 of each clip 1, and then the two clips 1 are coupled together at their pivotal coupler portions 5. Alternatively, the two clips 1 are coupled together in advance, and the electric wires 11 are mounted in the respective holder portions 2 in back-to-back arrangement. The latter case will now be described in greater detail.

The pivotal coupler portions 5 of the two clips 1 are coupled together with their holder portions 2 in back-to-back relation. To couple the two pivotal coupler portions 5, they are fitted sidewise into each other with the clamp portion 4 of each aligned with the gap between the bottom portion 2' and the intermediate portion 8 of the other. Each inserted clamp portion 4 is fitted on the shaft portion 3 of the other clip in the gap between the bottom portion 2+ and the intermediate portion 8. At this time, the bifurcated end of the clamp portion 4 comes into engagement with the outer periphery of the shaft portion 3. As the clamp portion 4 is further inserted, the flared opposite end surfaces 10 of its notch are forced apart. When the shaft portion 3 has been received in the inner portion 9, the bifurcated end portion of the clamp portion 4 is restored to its initial state due to its elasticity, so that the shaft portion 3 is retained in the inner portion 9 of the notch of the clamp portion 4. In this state, the intermediate portion 8 of each clip is received in the gap between the clamp portion 4 and the intermediate portion 8 of the other clip. When the two clips 1 are coupled together, their holder portions 2 are spaced apart in back-to-back relation. The two clips 1 are coupled together such that each can be rotated about the other's shaft portion 3. The angular range of rotation is defined by that at which the edges of side portions 7 of the two clips 1 strike against each other.

Thus, using the clips 1 in the coupled state, two wires 11 can be held in the holder portions 2 so as to run in parallel or to cross each other. As a wire 11 is inserted into the holder portion 2 from the open end thereof, the outer periphery of the wire 11 engages and forces apart the flared opposite edge portions 6 of the holder portion 2. When the wire 11 has been received in the holder portion 2, the edge portions 6 restore to the initial state due to their elasticity, so that the outer periphery of the wire 11 is clamped by the inner periphery of the holder portion 2. Since the clips 1 are mutually rotatable, even crossed wires 11 of complicated orientation can be retained by the combination clip. In addition, two wires 11 retained in the two holder portions 2 of the combination clip can be held as properly spaced apart. Further, even if strong forces should accidentally come to act on the wires 11 mounted in the combination clip, they can only be twisted to a limited degree since the relative rotation of the two clips 1 is restricted within a fixed range defined by the positions at which the edges of the side portions 7 of the pivotal coupler portions 5 of the clips strike each other. Thus, the wires will not swing excessively or become entangled, so that it is possible to prevent disconnection and contact failure.

Figure 8:
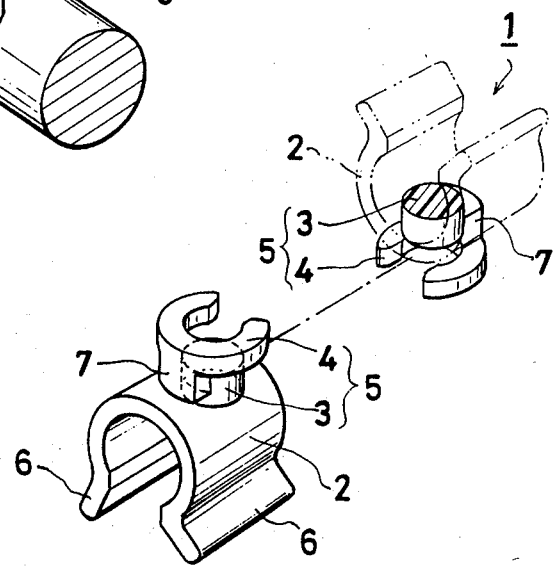
FIG. 8 is an exploded perspective view showing a different embodiment of the combination clip according to the invention.

FIGS. 8 and 9 show a different embodiment of the invention. This embodiment is different from the preceding embodiment in the pivotal coupler portion of the clip. In this clip, the shaft portion 3 extends from the bottom portion 2' integral with the holder portion 2. The side portion 7 extends along one side of the outer periphery of the shaft portion 3. The C-shaped clamp portion 4 extends perpendicularly from the free end of the side portion 7 in parallel with the bottom portion 2'. With this embodiment, the structure of the pivotal coupler portion 5 is simplified. In addition, the two clips 1 can be coupled together for mutual rotation about their shaft portions 3 by fitting the clamp portion 4 of each on the shaft portion 3 of the other. Further, the range of mutual rotation of the clips is defined by the positions at which the two side portions 7 strike each other.

The combination clip according to the invention can support not only wires or pipes but also plates or parts having other shapes. To facilitate the holding of plates or parts having other shapes, the holder portions may have an anchor-like structure.

As has been described in the foregoing, with the combination clip according to the invention, while the same functions as with the prior art combination clip can be obtained, since the clips of the pair are identically shaped, they can be molded using a common mold, thereby reducing the cost of manufacture. In addition, in use, no need arises to combine clips having different shapes, so that handling is greatly simplified.

What is claimed is:

1. A combination clip comprising a pair of identically shaped clips, each of said clips having a holder portion provided at one end for detachably holding a supported member and a pivotal coupler portion provided at the other end, said pivotal coupler portion including a cylindrical shaft portion and a clamp portion, the clamp portion being substantially cylindrical and open on one side, extending perpendicular to said shaft portion in spaced relation to the free end thereof and the clamp portion of each clip being capable of being fitted on the shaft portion of the other clip, whereby said pair of clips can be pivotally coupled together for rotation about each other's shaft portions with said clamp portion of each clip fitted on said shaft portion of the other clip.

2. The combination clip as set forth in claim 1 wherein each clip has a transverse wall terminating said cylindrical shaft portion and spaced from said clamp portion.

3. The combination clip as set forth in claim 1 wherein each clip cylindrical shaft portion has a free end spaced axially from the clamp portion.

* * * * *